US012650214B2

(12) United States Patent
Liu et al.

(10) Patent No.: US 12,650,214 B2
(45) Date of Patent: Jun. 9, 2026

(54) INDIRECT LUMINAIRE

(71) Applicant: SIGNIFY HOLDING B.V., Eindhoven (NL)

(72) Inventors: Qi Liu, Shanghai (CN); Liping Wang, Shanghai (CN); Rui Li, Shanghai (CN); Xinyong Tang, Shanghai (CN)

(73) Assignee: SIGNIFY HOLDING B.V., Eindhoven (NL)

(*) Notice: Subject to any disclaimer, the term of this patent is extended or adjusted under 35 U.S.C. 154(b) by 35 days.

(21) Appl. No.: 18/699,863

(22) PCT Filed: Oct. 12, 2022

(86) PCT No.: PCT/EP2022/078356
§ 371 (c)(1),
(2) Date: Apr. 9, 2024

(87) PCT Pub. No.: WO2023/066747
PCT Pub. Date: Apr. 27, 2023

(65) Prior Publication Data

US 2024/0418344 A1 Dec. 19, 2024

(30) Foreign Application Priority Data

Oct. 19, 2021 (WO) ................ PCT/CN2021/124655
Dec. 6, 2021 (EP) .................................... 21212542

(51) Int. Cl.
*F21V 7/00* (2006.01)
*F21S 8/02* (2006.01)
(Continued)

(52) U.S. Cl.
CPC .............. *F21V 7/0008* (2013.01); *F21S 8/02* (2013.01); *F21V 5/046* (2013.01); *F21V 21/047* (2013.01); *F21V 29/50* (2015.01); *F21Y 2105/18* (2016.08); *F21Y 2113/00* (2013.01); *F21Y 2115/10* (2016.08)

(58) Field of Classification Search
CPC ...... F21V 7/0008; F21V 7/0025; F21V 13/04; F21V 29/505; F21V 7/06; F21V 13/10; F21V 5/04; F21S 8/02; F21S 8/026; F21Y 105/18
See application file for complete search history.

(56) References Cited

U.S. PATENT DOCUMENTS 3,560,729 A * 2/1971 Liberman ........... F21V 33/0088 362/264
6,561,678 B2 * 5/2003 Loughrey ............... F21V 7/005 362/322

(Continued)

FOREIGN PATENT DOCUMENTS

CN 109210444 A 1/2019
EP 2177820 A3 8/2012

(Continued)

*Primary Examiner* — William J Carter

(57) ABSTRACT

A luminaire delivers indirect light through a light exit window, after reflection by a reflector housing. The reflector housing comprises a central area and a peripheral area. The peripheral area is for redirecting light to the light exit window, whereas the central area is outside the area of the light paths to the light exit window. A component is located at the central area.

13 Claims, 6 Drawing Sheets

(51) Int. Cl.

| | |
|---|---|
| ***F21V 5/04*** | (2006.01) |
| ***F21V 21/04*** | (2006.01) |
| ***F21V 29/50*** | (2015.01) |
| ***F21Y 105/18*** | (2016.01) |
| *F21Y 113/00* | (2016.01) |
| *F21Y 115/10* | (2016.01) |

(56) References Cited

U.S. PATENT DOCUMENTS

| | | | | |
|---|---|---|---|---|
| 8,425,101 | B2 * | 4/2013 | Boonekamp | F21V 9/30 362/609 |
| 8,523,389 | B2 * | 9/2013 | Holten | F21V 13/10 362/240 |
| 2011/0002682 | A1 * | 1/2011 | Messina | F21V 7/28 396/200 |
| 2012/0051041 | A1 * | 3/2012 | Edmond | F21V 7/30 362/296.01 |
| 2015/0233543 | A1 | 8/2015 | Radl et al. | |
| 2018/0073694 | A1 * | 3/2018 | Tong | F21V 3/00 |
| 2020/0080692 | A1 | 3/2020 | Li et al. | |
| 2020/0124270 | A1 | 4/2020 | Spencer et al. | |

FOREIGN PATENT DOCUMENTS

| | | | |
|---|---|---|---|
| JP | 2007080533 | A | 3/2007 |
| WO | 2010029475 | A1 | 3/2010 |
| WO | 2014155224 | A1 | 10/2014 |
| WO | 2018215345 | A1 | 11/2018 |

* cited by examiner

INDIRECT LUMINAIRE

CROSS-REFERENCE TO PRIOR APPLICATIONS

This application is the U.S. National Phase application under 35 U.S.C. § 371 of International Application No. PCT/EP2022/078356, filed on Oct. 12, 2022, and International Application No. PCT/CN2021/124655, filed on Oct. 19, 2021, which claims the benefit of European Patent Application Ser. No. 21/212,542.1, filed on Dec. 6, 2021. These applications are hereby incorporated by reference herein.

FIELD OF THE INVENTION

This invention relates to luminaires, in particular indirect luminaires, namely luminaires having a light source which is not directly visible for an external viewer because all light is reflected before being emitted from a light emitting window of the luminaire. The invention for example relates to a downlight.

BACKGROUND OF THE INVENTION

There are various requirements for a luminaires, such as downlights, for example to create a desired light output distribution and enabling dissipation of generated heat, and all within a compact design.

There is also an ever increasing interest in incorporating additional functionality into a luminaire design, such as ambient light sensing, or presence detection, or indeed other functions. However, additional components for these other functions must not interfere with the desired light output characteristics of the luminaire. As a result, it is difficult to incorporate additional components for these other functions without increasing the size of the luminaire or complicating the design.

SUMMARY OF THE INVENTION

The invention is defined by the claims.

According to examples in accordance with an aspect of the invention, there is provided an indirect luminaire, comprising:

- a carrier part having an external face and an internal face, wherein a light exit window is formed by the carrier part;
- a light source array mounted over the internal face of the carrier part, wherein the carrier part is adapted to shield the light source array from being directly viewed by an observer through the light exit window;
- a reflector housing over the light source array, wherein the light output from the light source array is directed to the reflector housing for reflection towards the light exit window,
- wherein inner surface of the reflector housing comprises a central area and a peripheral area, wherein the peripheral area is disposed over the light source array for redirecting the light output from the light source array to the light exit window, and wherein the central area is outside the area of predetermined light paths from the light source array to the light exit window,
- wherein the luminaire further comprises a component located at the central area.

The luminaire has low glare because it uses indirect light, namely light that has been reflected by the reflector housing. The indirect lighting design reduces the overall size of the luminaire, for example to achieve a desired output beam angle, such as 60 degrees.

The invention is based on the recognition that the luminaire can be designed such that there is substantially no light mixing at a central area of the reflector housing. This space may thus be used for the mounting of components, so that those components will not influence the optical performance of the luminaire, but without needing additional space to be allocated to those components.

Note that the "predetermined light paths" are the light paths expected to result from the light output characteristics of the light source array (e.g. the intensity versus emission direction characteristics). There may be some stray light paths or scattered light paths (e.g. from air particles) which will reach the central area, but these are not the predetermined light paths. Thus, these scattered or stray light paths are not part of the designed light exit paths through the exit window. Thus, the dominant or principal light paths from the light source array to the light exit window do not pass through the central area at which the component is positioned. Thus, the predetermined light paths are the intended light paths or the designed light paths of the luminaire from the light source to the light exit window.

The light source array for example comprises one or more rings of LEDs.

These rings extend around the light exit window.

The luminaire may further comprise an optical beam shaping arrangement over the light source array. This creates a suitable angular distribution for illuminating the peripheral area (only) of the reflector housing.

The optical beam shaping arrangement for example comprises an annular lens. It is formed over the ring or rings of LEDs.

The reflector housing is preferably metal. Thus, it can contribute to the thermal management of the luminaire.

The reflector housing preferably has a specular reflective surface. Thus, the reflected beams have a single known direction so that the light paths can be designed such that they do not reach the central area.

The carrier part is preferably also metal. Thus, the carrier part is also able to contribute to the dissipation of heat.

The overall structure of the luminaire thus provides heat dissipation, and this for example avoids the need for a fin cooling system.

The light exit window for example comprises an opening in the carrier part. When no diffuser or other solid window is provided, there is no reflection of light back to the central area (where the component is positioned) from the optical output window of the luminaire.

In one example, the component comprises a sensor. Thus, a sensor can be incorporated into the luminaire design by using space which is not playing a role in the delivery of light to the light exit window.

The component for example comprises a light sensor.

The luminaire then incorporates a light sensor, for example for monitoring ambient light levels when the light source is turned off. Because there is no (intended) light mixing at the central area, the light sensor may also be used to measure the lighting level in the area illuminated by the luminaire, even when the light is turned on. The light source activation does not saturate the light sensor so it can still function to monitor light levels.

The component may instead comprise an occupancy sensor. Thus, the luminaire can incorporate an occupancy sensor, for example for implementing automated lighting based on presence detection.

The component may instead comprise a conduit for delivering an air flow through the luminaire. Thus, the luminaire may function as part of a ventilation or air conditioning or filtering system.

Thus, various additional functions may be implemented which make use of the central area of the reflector housing, where there is no interference with the light output. The luminaire for example comprises a downlight.

The downlight for example comprises a circular body for recess mounting in a ceiling, wherein the downlight further comprises a spring biasing system for fixing the downlight to the ceiling.

The downlight may instead be for surface mounting against a ceiling or indeed for suspension below a ceiling.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
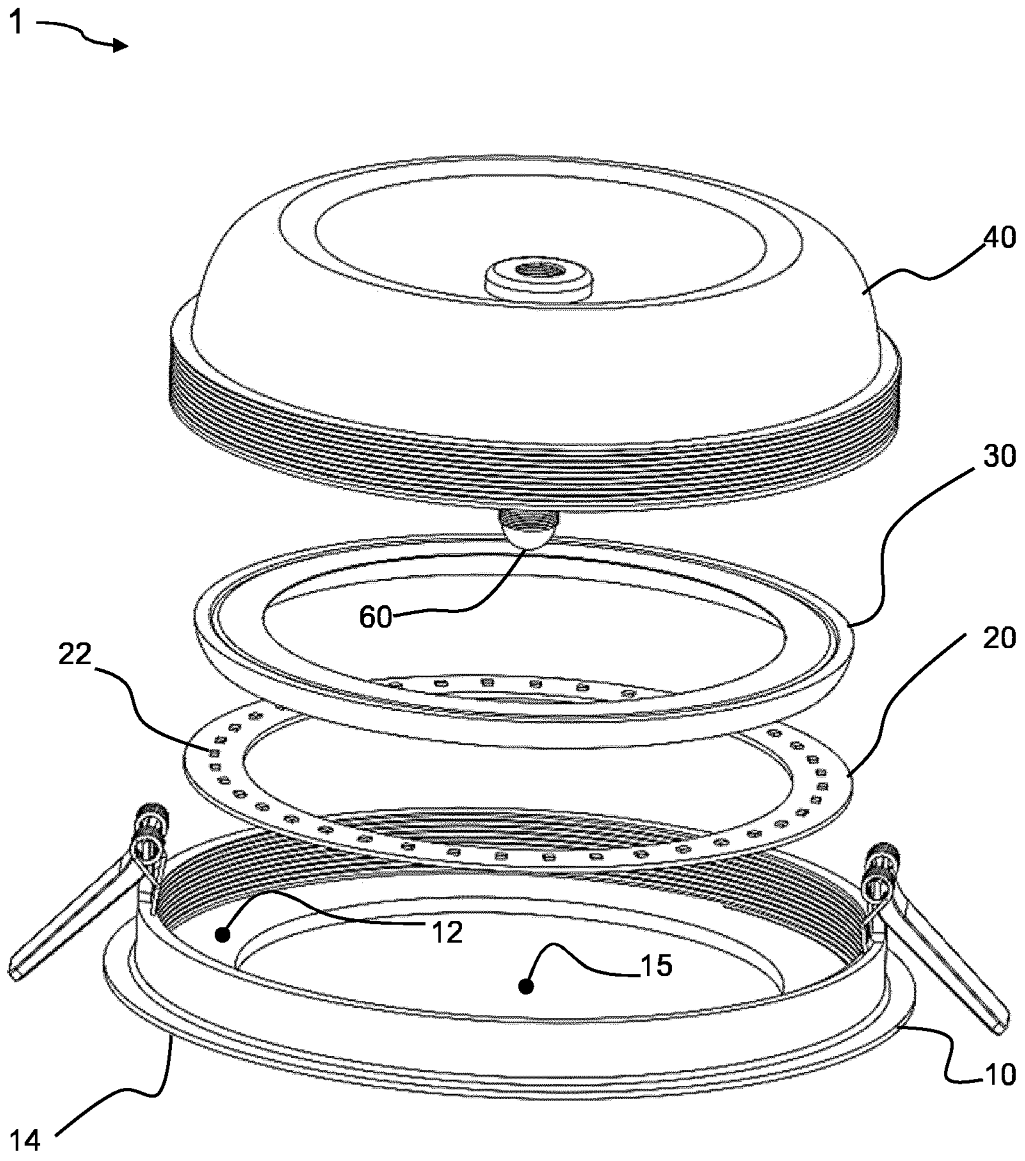
FIG. 1 shows a downlight in exploded view as one example of a luminaire.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a luminaire which delivers indirect light through a light exit window, after reflection by a reflector housing. The reflector housing comprises a central area and a peripheral area. The peripheral area is for redirecting light to the light exit window, whereas the central area is outside the area of predetermined (intended or designed) light paths to the light exit window. A component is located at the central area.

The invention may be applied generally to any indirect luminaire, namely a luminaire having a light source which is not directly visible for an external viewer because all light is reflected before being emitted from a light emitting window of the luminaire.

The invention will be explained with reference to a downlight, and FIG. 1 shows a downlight 1 in exploded view.

The downlight comprises a carrier part 10 having an internal face 12 and an external face 14. The internal face is within the interior volume of the downlight, i.e. it faces inwardly into the downlight volume, and the external face defines an outer surface of the downlight. Thus it faces outwardly.

In a typical use case, the outer surface 14 is a bottom external horizontal face of the downlight. A light exit window 15 is formed by the carrier part 10. The light exit window for example comprises an opening in the carrier part 10 with no diffuser and preferably also no cover, thereby to limit reflection of light back to interior volume of the downlight.

A light source array 20 is mounted over the internal face 12 of the carrier part 10. The light source array comprises a printed circuit board which carries an array of LEDs 22. The LEDs 22 may be arranged in one or more concentric rings around the printed circuit board.

The LEDs emit light towards the inner volume of the downlight, and hence in a typical use case they emit light generally upwardly. The LEDs are mounted on the inner (top) surface of the carrier part 10 so that the carrier part shields the LEDs of the light source array 20 from being directly viewed by an observer through the light exit window 15. In the example shown, an optical beam shaping arrangement 30 is provided over the light source array 20. The optical beam shaping arrangement 30 for example comprises an annular lens.

However, the LEDs may instead be provided with individual output optics, or indeed the direct output of the LEDs may be used. Thus, the need for a beam shaping arrangement depends on the characteristics of the light output from the LEDs of the light source array 20.

A reflector housing 40 is provided over the light source array 20, and over the optical beam shaping arrangement 30 when one is used. The light output from the light source array 20 is directed to the reflector housing 40 for reflection back towards, and through, the light exit window 15 to generate the downward output illumination.

Figure 2:
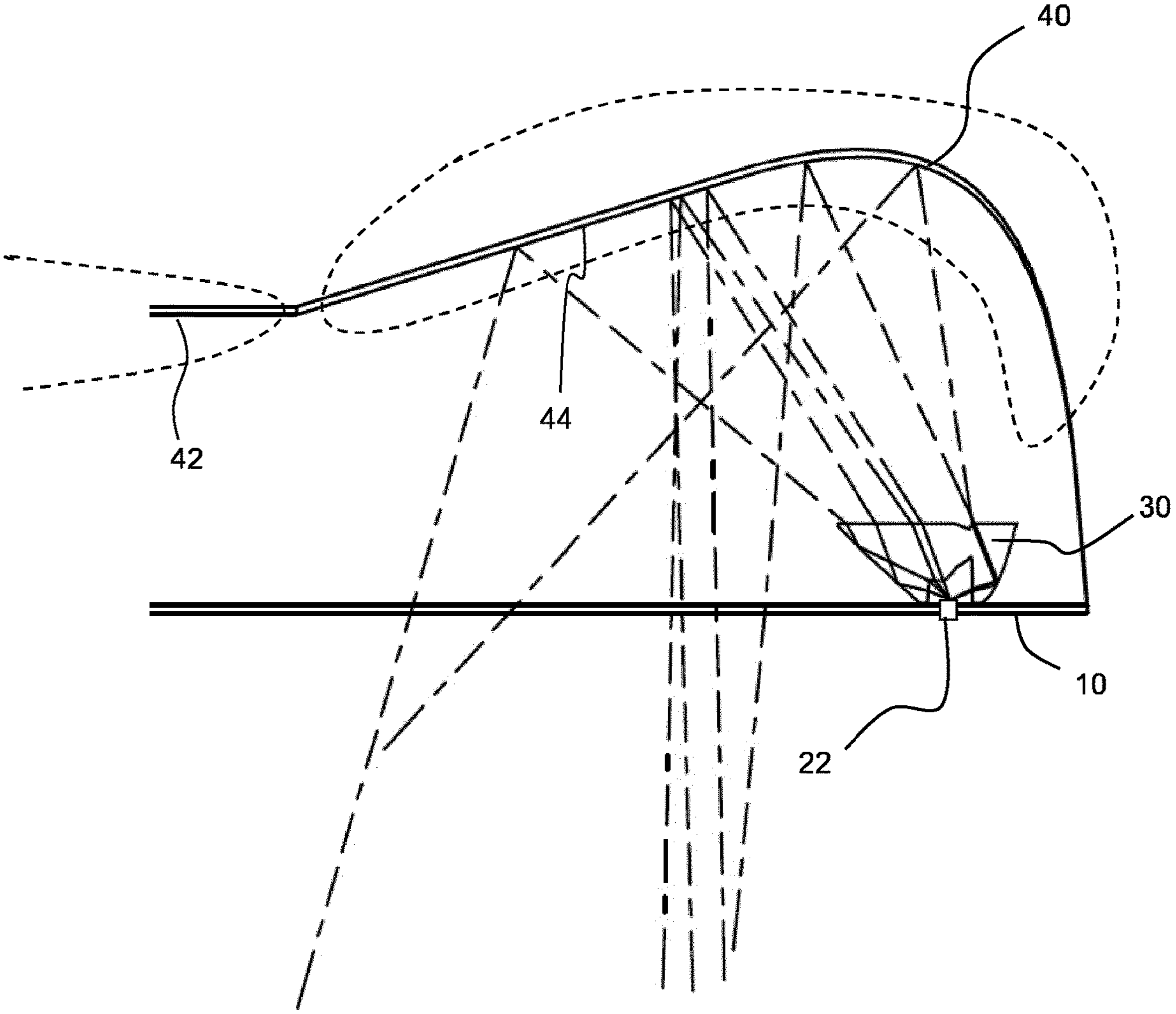
FIG. 2 shows light paths from one LED to the reflector housing.

Referring to FIG. 2, the inner surface of the reflector housing 40 comprises a central area 42 and a peripheral area 44. The peripheral area 44 is disposed over the light source array, and over the optical beam shaping arrangement 30, for redirecting the light output from the light source array to the light exit window.

The central area 42 is however outside the area through which the intended light paths pass from the light source array to the light exit window.

By way of example, the downlight may have a diameter of 25 cm and a depth of 6.8 cm.

FIG. 2 shows light paths from one LED 22, through the beam shaping arrangement 30, to the reflector housing 40. The inner surface of the reflector housing 40 is specular reflective to avoid light scattering and diffusion. In this way, as can be seen, there are no intended light paths reaching the central area 42, whereas the peripheral area 44 provides the reflections to deliver indirect light to the light exit window.

The peripheral area has a shape which, in combination with the light output characteristics from the optical beam shaping arrangement 30 (or from the light source array), generates the desired light output distribution.

These "intended" light paths are predetermined light paths for the ideal LED output characteristics and the idea specular reflection characteristics, hence ignoring unintentional scattering or diffusion. Thus, the predetermined or intended light paths are the light paths of the design specification for the light source arrangement, beam shaping arrangement and reflector housing. Of course, real life imperfections will result in some light reaching the central area 42 but these imperfections can be neglected for the purposes of this discussion.

For example, the predetermined light paths may be taken to be the light paths from the light source for a beam width including the maximum intensity down to a 50% intensity, as explained further below with reference to FIG. 3.

The invention is based on the recognition that a luminaire, such as a downlight, can be designed such that there is no (intended) light mixing at the central area of the reflector housing, and there is a volume at or beneath that central area of the reflector housing where there are no intended light paths. Thus, this central volume may be used for the mounting of components such that they will not influence the optical performance of the luminaire, but without needing additional space to be allocated to those components.

Returning to FIG. 1, the downlight further comprises a component 60 located at the central area. This central area may be considered to be the surface of the reflector housing but also a volume beneath the surface of the reflector housing where no intended direct or reflected light paths from the light source array 20 are present. Thus, "located at the central area" means located within a volume at the central area.

The downlight has low glare because it uses indirect light, namely light that has been reflected by the reflector housing. The design can also avoid the need for large thermal fins, for example, because the reflector housing 40 and the carrier part 10 can each be formed of metal to provide good thermal conduction.

Figure 3:
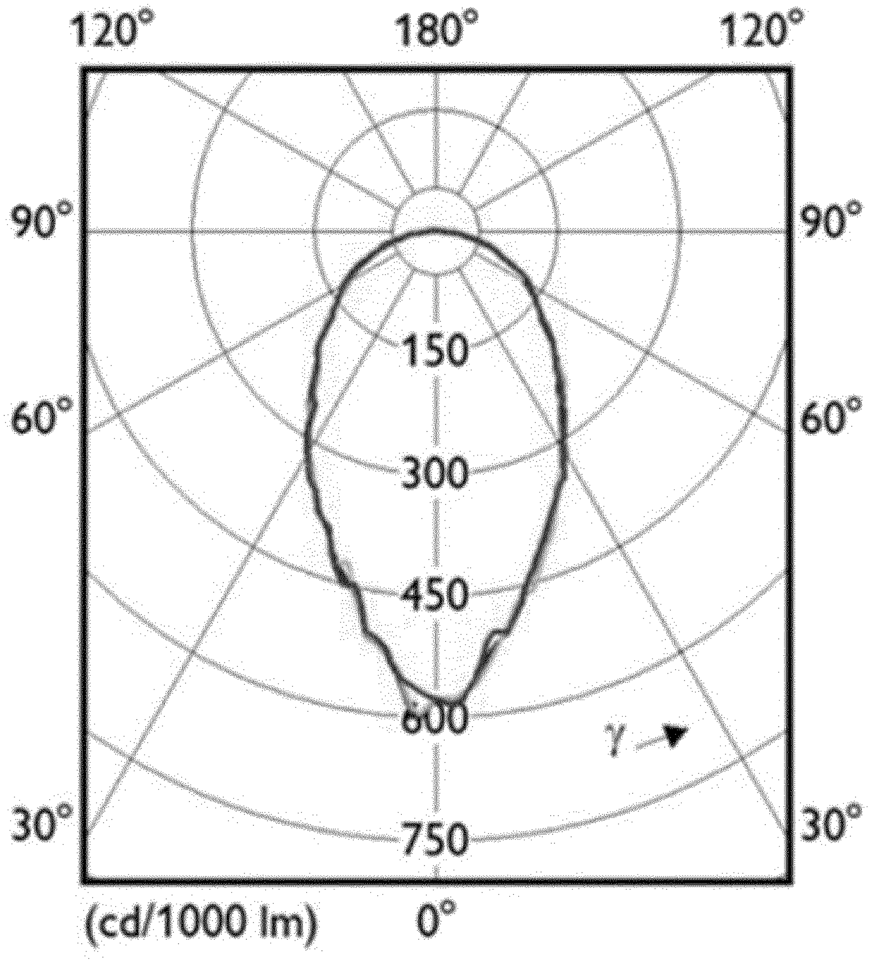
FIG. 3 shows the light output characteristics from the downlight.

FIG. 3 shows the light output characteristics from the downlight. It shows the polar illumination intensity for two orthogonal vertical planes (the two plots overlap as the design is circular symmetric). It shows that the beam angle is about 60 degrees, at half the maximum intensity. Thus, the maximum intensity is 600 cd and the beam angle at 300 cd is 60 degrees.

Thus, the light in this 60 degree beam angle does not reach the central area, and it may be considered to constitute the intended light output from the light source. Thus, the "intended light paths" may be considered to be the light paths from the light source array with maximum intensity down to 50% of the maximum intensity.

Figure 4:
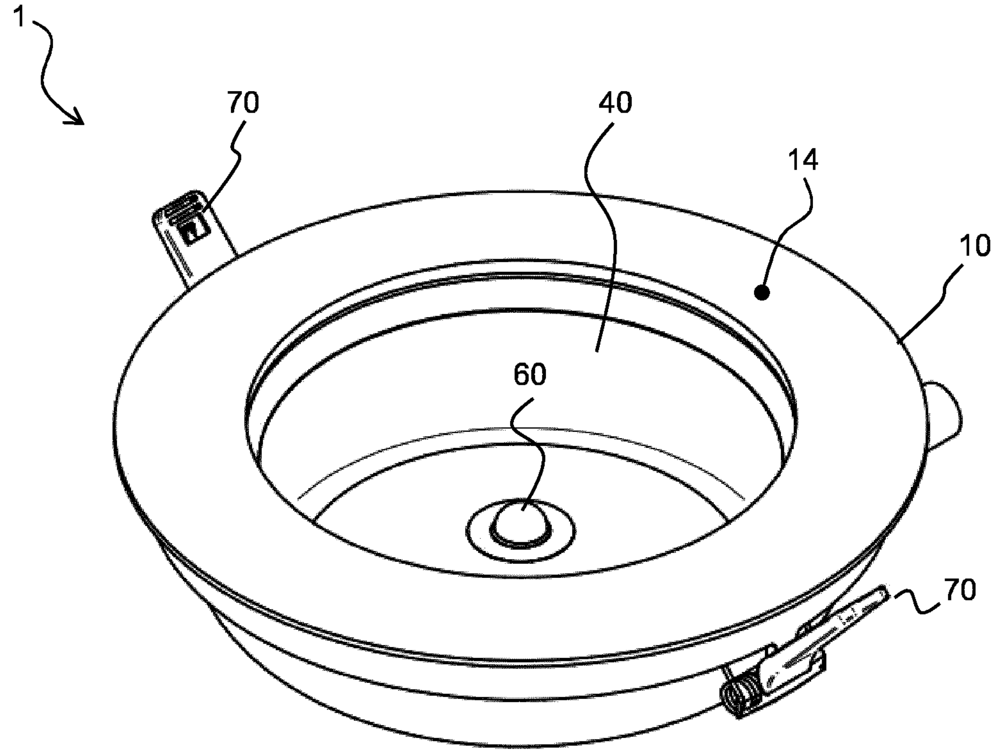
FIG. 4 shows the assembled downlight, in perspective view from a bottom face.

FIG. 4 shows the assembled downlight, in perspective view from the bottom face. This example is for recess mounting in a ceiling, and comprises a circular body with spring biased clips 70 for lifting the downlight against the ceiling surface. In particular, the carrier part 10 extends beyond and hence covers the opening in the ceiling, in conventional manner.

Figure 5:
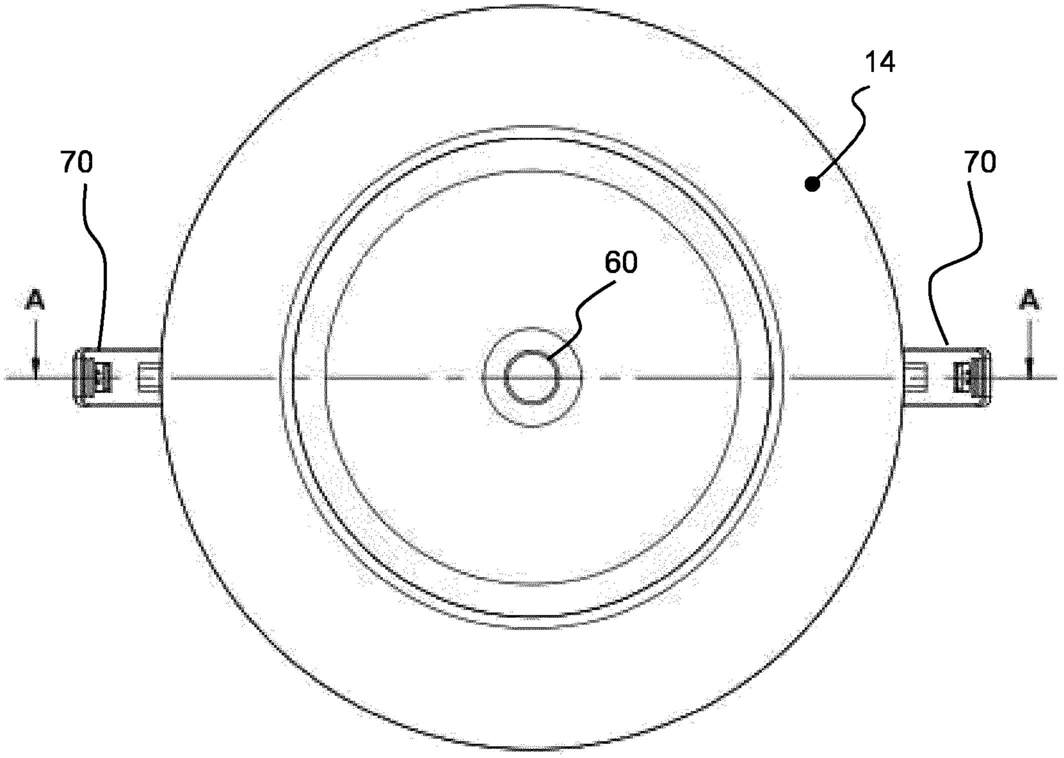
FIG. 5 shows the assembled downlight, in plan view looking at the bottom face.

FIG. 5 shows the assembled downlight, in plan view looking at the bottom face. This example is for recess mounting in a ceiling, and comprises a circular body with spring biased clips 70 for lifting the downlight against the ceiling.

Figure 6:
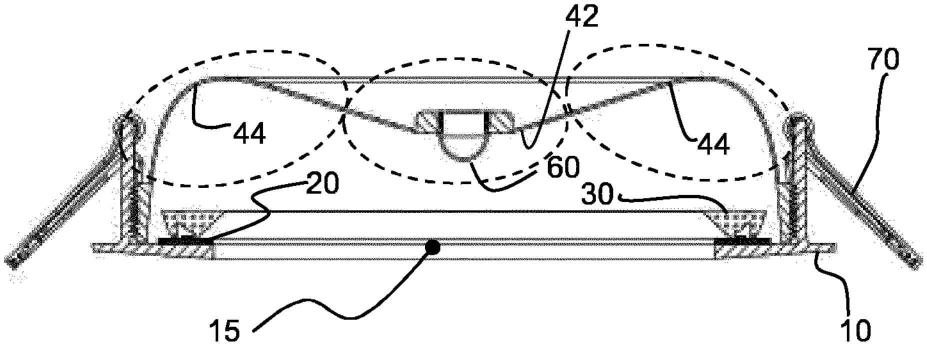
FIG. 6 shows the assembled downlight, in cross sectional side view along line A-A in FIG. 5.

FIG. 6 shows the assembled downlight, in cross sectional side view along line A-A in FIG. 5. It shows the component 60 mounted in a position within the central area 42 of the reflector housing, and associated internal volume of the downlight which is free of direct light beams from the light source array and free of reflected beams from the reflector housing.

There are various options for the component 60.

In one set of examples, the component 60 comprises a sensor. Thus, a sensor can be incorporated into the downlight design by using space which is not playing a role in the delivering of light to the light exit window.

The sensor for example comprises a light sensor. The light sensor may be used for monitoring ambient light levels when the light source is turned off. Because there is no light mixing at the central area, the light sensor may also be used to measure the lighting level in the area illuminated by the downlight, even when the light is turned on. The light source activation does not saturate the light sensor so it can still function to monitor light levels.

The component may instead comprises an occupancy sensor for example for implementing automated lighting based on presence detection.

Figure 7:
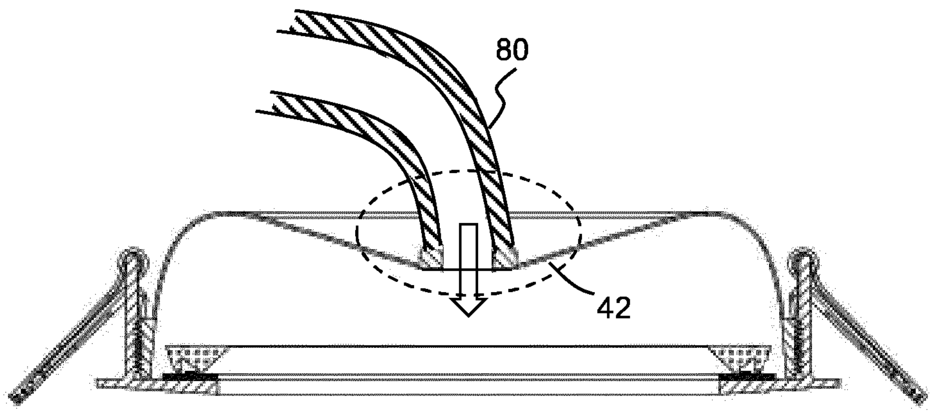
FIG. 7 shows an example in which a conduit is provided for delivering an air flow through the downlight.

In another example shown in FIG. 7, the component comprises a conduit 80 for delivering an air flow through the downlight. This may be part of a ventilation or air purification system.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. An indirect luminaire, comprising:

a carrier part having an external face and an internal face, wherein a light exit window is formed by the carrier part;

a light source array mounted over the internal face of the carrier part, wherein the carrier part is adapted to shield the light source array from being directly viewed by an observer through the light exit window; and a reflector housing over the light source array, wherein the light output from the light source array is directed to the reflector housing for reflection towards the light exit window, wherein inner surface of the reflector housing comprises a central area and a peripheral area, wherein the peripheral area is disposed over the light source array for redirecting the light output from the light source array to the light exit window, and wherein the central area is outside the area of predetermined light paths from the light source array to the light exit window, wherein the luminaire further comprises a component located at the central area, and the component comprises a sensor.

2. The luminaire of claim 1, wherein the light source array comprises one or more rings of LEDs.

3. The luminaire of claim 1, further comprising an optical beam shaping arrangement over the light source array.

4. The luminaire of claim 3, wherein the optical beam shaping arrangement comprises an annular lens.

5. The luminaire of claim 1, wherein the reflector housing is metal.

6. The luminaire of claim 1, wherein the reflector housing has a specular reflective surface.

7. The luminaire of claim 1, wherein the carrier part is metal.

8. The luminaire of claim 1, wherein the light exit window comprises an opening in the carrier part.

9. The luminaire of claim 1, wherein the component comprises a light sensor.

10. The luminaire of claim 1, wherein the component comprises an occupancy sensor.

11. The luminaire of claim 1, wherein the component comprises a conduit for delivering an air flow through the luminaire.

12. The luminaire of claim 1 comprising a downlight.

13. The luminaire of claim 12, comprising a circular body for recess mounting in a ceiling, wherein the luminaire further comprises a spring biasing system for fixing the luminaire to the ceiling.

* * * * *